(12) United States Patent
Thrun et al.

(10) Patent No.: US 10,773,799 B1
(45) Date of Patent: Sep. 15, 2020

(54) VERTICALLY-TETHERED MULTICOPTERS

(71) Applicant: Kitty Hawk Corporation, Mountain View, CA (US)

(72) Inventors: Sebastian Thrun, Los Altos Hills, CA (US); Damon Vander Lind, East Palo Alto, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 345 days.

(21) Appl. No.: 15/875,648

(22) Filed: Jan. 19, 2018

Related U.S. Application Data

(60) Provisional application No. 62/454,413, filed on Feb. 3, 2017.

(51) Int. Cl.
| | |
|---|---|
| *B64C 39/02* | (2006.01) |
| *B64C 37/02* | (2006.01) |
| *B64D 1/22* | (2006.01) |

(52) U.S. Cl.
CPC ........... *B64C 37/02* (2013.01); *B64C 39/022* (2013.01); *B64C 39/024* (2013.01); *B64D 1/22* (2013.01); *B64C 2201/027* (2013.01); *B64C 2201/042* (2013.01); *B64C 2201/06* (2013.01); *B64C 2201/108* (2013.01); *B64C 2201/128* (2013.01)

(58) Field of Classification Search
CPC . B64C 37/02; B64C 39/022; B64C 2201/128; B64C 2201/06; B64D 1/22
USPC .......................................................... 244/2
See application file for complete search history.

(56) References Cited

U.S. PATENT DOCUMENTS

| | | | | |
|---|---|---|---|---|
| 3,656,723 | A | * | 4/1972 | Piasecki ............... B64C 27/12 244/2 |
| 4,695,012 | A | * | 9/1987 | Lindenbaum ........... B64B 1/24 244/137.4 |
| 9,079,662 | B1 | * | 7/2015 | Duffy ................... B64C 37/02 |
| 9,205,922 | B1 | * | 12/2015 | Bouwer ................. B64D 9/00 |
| 2009/0152391 | A1 | * | 6/2009 | McWhirk ............... B64B 1/02 244/30 |
| 2015/0120126 | A1 | * | 4/2015 | So ......................... G01C 23/00 701/26 |
| 2016/0318607 | A1 | * | 11/2016 | Desai .................... A01M 7/00 |
| 2017/0144754 | A1 | * | 5/2017 | Limvorapun ........... B60L 50/72 |
| 2017/0197718 | A1 | * | 7/2017 | Buchmueller ......... B64D 47/08 |
| 2017/0225784 | A1 | * | 8/2017 | Hayes ................... B63B 21/50 |

(Continued)

FOREIGN PATENT DOCUMENTS

| | | | | |
|---|---|---|---|---|
| CA | 2947688 A1 | * | 5/2017 | ............ B64C 19/02 |
| WO | WO-2019041038 A1 | * | 3/2019 | ............ F16D 48/06 |

OTHER PUBLICATIONS

Definition of "Carry", Oxford English Dictionary, retrieved by Examiner Brown from lexico.com/en/definition/carry on Feb. 24, 2020. (Year: 2020).*

*Primary Examiner* — Claude J Brown

(74) *Attorney, Agent, or Firm* — Van Pelt, Yi & James LLP

(57) ABSTRACT

A system includes a higher unmanned multicopter, a lower unmanned multicopter, and a flexible connector. The flexible connector connects the higher unmanned multicopter and the lower unmanned multicopter. The VTM system is configured to carry a payload, including by having the higher unmanned multicopter fly above the lower unmanned multicopter with the flexible connector taut such that both the higher unmanned multicopter and the lower unmanned multicopter contribute to carrying the payload.

21 Claims, 16 Drawing Sheets

(56) References Cited

U.S. PATENT DOCUMENTS

| | | |
|---|---|---|
| 2017/0291704 A1* | 10/2017 | Alegria ............... G01S 13/933 |
| 2018/0032089 A1* | 2/2018 | Vander Lind ......... B64C 39/022 |
| 2018/0326441 A1* | 11/2018 | Liu ...................... B05B 15/62 |
| 2019/0217952 A1* | 7/2019 | Zawadzki ............. B64C 39/022 |
| 2019/0283871 A1* | 9/2019 | Wieczorek ............ B64C 27/08 |

* cited by examiner

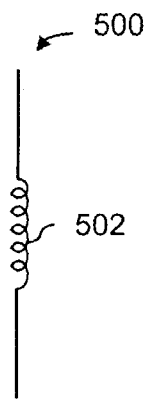
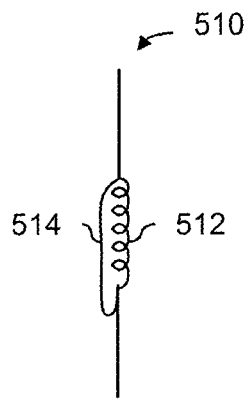
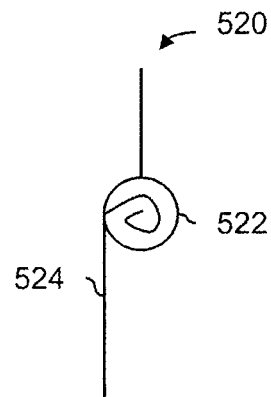
FIG. 5A          FIG. 5B          FIG. 5C
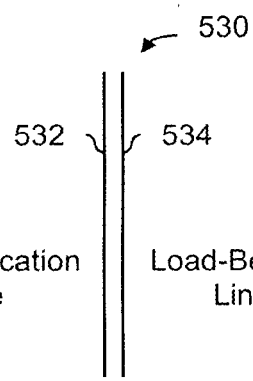
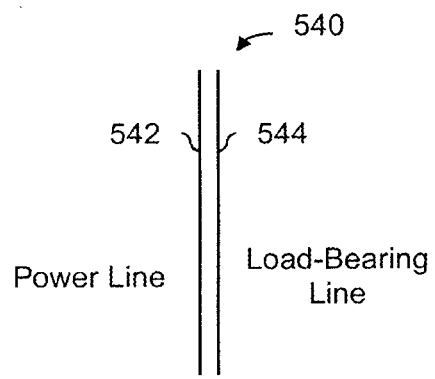
FIG. 5D          FIG. 5E

VERTICALLY-TETHERED MULTICOPTERS

CROSS REFERENCE TO OTHER APPLICATIONS

This application claims priority to U.S. Provisional Patent Application No. 62/454,413 entitled VERTICALLY-TETHERED MULTICOPTERS filed Feb. 3, 2017 which is incorporated herein by reference for all purposes.

BACKGROUND OF THE INVENTION

With the soaring popularity of online shopping, more and more packages are being delivered. New techniques for delivering packages (or, more generally, payloads) which are faster, cheaper, and/or more energy efficient compared to existing techniques (e.g., delivery trucks) would be desirable.

BRIEF DESCRIPTION OF THE DRAWINGS

Various embodiments of the invention are disclosed in the following detailed description and the accompanying drawings.

FIG. 5A is a diagram illustrating an embodiment of a flexible connector with an elastic portion.

FIG. 5B is a diagram illustrating an embodiment of a flexible connector with an elastic portion and an inelastic portion.

FIG. 5C is a diagram illustrating an embodiment of a retractable, roll-up flexible connector.

FIG. 5D is a diagram illustrating an embodiment of a flexible connector with a communication line and a load-bearing line.

FIG. 5E is a diagram illustrating an embodiment of a flexible connector with a power line and a load-bearing line.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following figures illustrate various embodiments of a vertically-tethered multicopter system. Various features and/or techniques which are separately and/or individually described below may be combined in a vertically-tethered multicopter system as desired.

Figure 1:
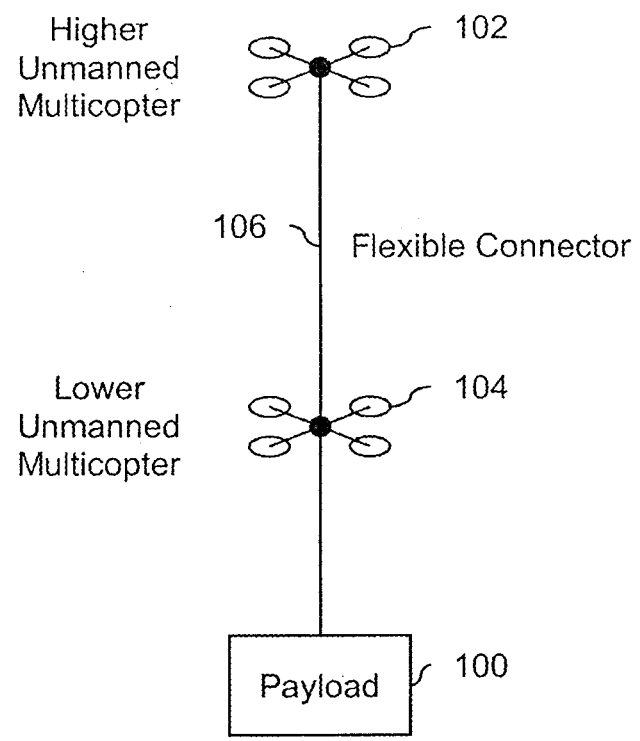
FIG. 1 is a diagram illustrating an embodiment of a vertically-tethered multicopter system.

FIG. 1 is a diagram illustrating an embodiment of a vertically-tethered multicopter system. In the example shown, the system is in the air and is carrying a payload (100). The system includes a higher unmanned multicopter (102) and a lower unmanned multicopter (104). In some embodiments, the multicopters are battery powered. As shown here, during flight, the higher unmanned multicopter (102) flies (e.g., directly) above the lower unmanned multicopter (104). The two multicopters are connected by a flexible connector (106) and during flight (as shown here), the flexible connector is taut and vertically tethers the two multicopters to each other. As a result of the taut flexible connector and the positions of the multicopters (e.g., one above the other), both multicopters contribute to carrying the payload.

The following figures describe an example of how a payload is picked up and dropped off which illustrates some benefits associated with a vertically-tethered multicopter system.

Figure 2A:
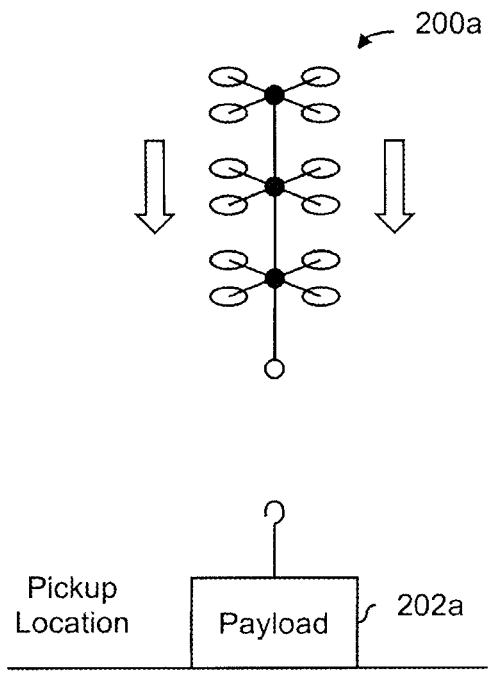
FIG. 2A is a diagram illustrating an embodiment of a vertically-tethered multicopter (VTM) system vertically descending to pick up a payload.

FIG. 2A is a diagram illustrating an embodiment of a vertically-tethered multicopter (VTM) system vertically descending to pick up a payload. In the example shown, the VTM system (200a) includes three quadcopters which are vertically connected to each other using a flexible tether (or, more generally, a flexible connector). In this figure and the following figures, the exemplary VTM system is used to transport a payload from a pickup location to a drop off location. In this example, the VTM system (200a) vertically descends towards the payload (202a) which is on the ground at the pickup location.

Figure 2B:
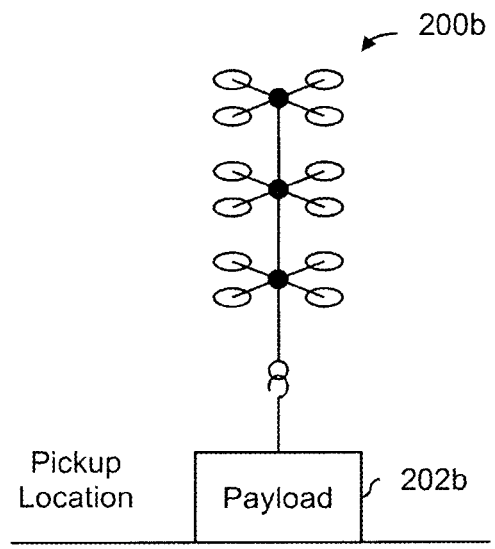
FIG. 2B is a diagram illustrating an embodiment of a vertically-tethered multicopter (VTM) system hovering so that a payload can be detachably coupled to the vertically-tethered multicopter (VTM) system.

FIG. 2B is a diagram illustrating an embodiment of a vertically-tethered multicopter (VTM) system hovering so that a payload can be detachably coupled to the vertically-tethered multicopter (VTM) system. In this state, the VTM system (200b) has descended to a height low enough for the VTM system (200b) and payload (202b) to be detachably connected to each other while the VTM system hovers in the air (i.e., none of the multicopters land). In this example, a hook and ring are used but any other type of connector may be used (e.g., carabiners).

In some embodiments, there is someone on the ground to help attach the payload to the VTM system. For example, the pickup location may be a warehouse and a warehouse worker helps to attach the payload to the VTM system. Alternatively, the payload may be picked up or otherwise attached to the VTM system without human intervention (e.g., because it is faster and/or safer). For example, the payload may attach to the VTM system using a magnet, or there may be mechanical means (e.g., a funnel or narrowing channel) for capturing the end of the tether and guiding it to some connection point on the payload.

In various embodiments, the payload is attached to the VTM via the tether in a variety of ways. In some embodiments, the connection is magnetic (e.g., the payload includes a metal locker which a package is placed in; the end of the tether has a magnet which magnetically attaches to the basket or locker). In some embodiments, a carabiner or clip is used. These are merely some examples and are not intended to be limiting.

Figure 2C:
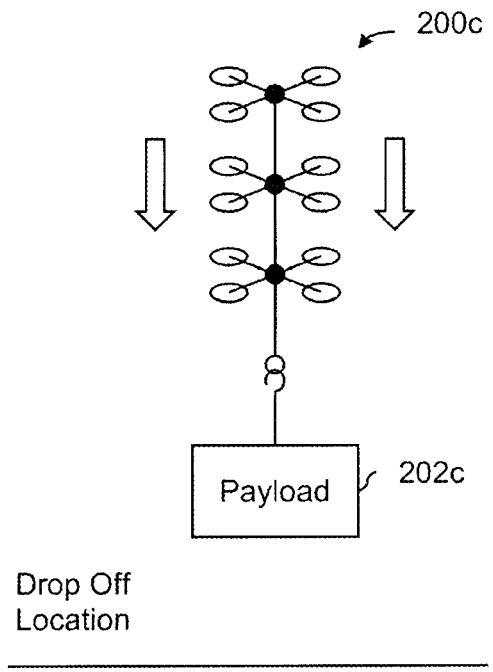
FIG. 2C is a diagram illustrating an embodiment of a vertically-tethered multicopter (VTM) system vertically descending to drop off a payload.

FIG. 2C is a diagram illustrating an embodiment of a vertically-tethered multicopter (VTM) system vertically descending to drop off a payload. The VTM system (with the payload detachably coupled) flies from the pickup location to the drop off location (not shown). Once the VTM system arrives at the drop off location, the VTM system (200c) will vertically descend in order to drop the payload (202c) off.

Once the payload is touching the ground (not shown), the payload and the VTM system are decoupled from each other while the VTM system remains airborne (i.e., the multicopters do not land). In some embodiments, the drop off location is unattended and a pilot or operator of the VTM system remotely instructs the VTM to release the payload once the payload is on the ground. For example, if the payload is a package being delivered, there may not be anyone home.

Figure 2D:
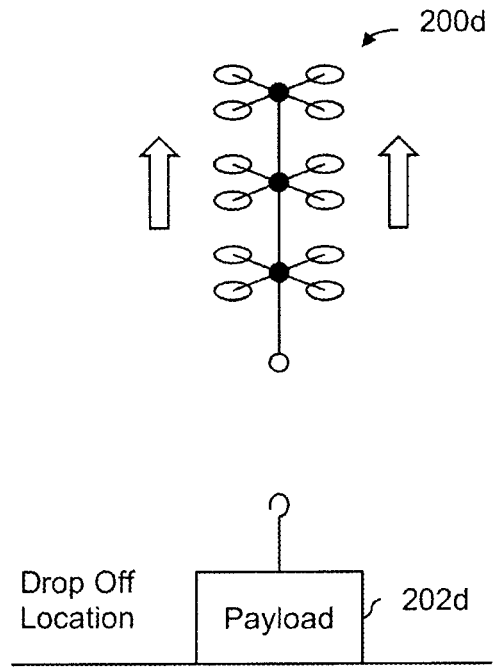
FIG. 2D is a diagram illustrating an embodiment of a vertically-tethered multicopter (VTM) system vertically ascending after dropping off a payload.

FIG. 2D is a diagram illustrating an embodiment of a vertically-tethered multicopter (VTM) system vertically ascending after dropping off a payload. Once the payload (202d) and VTM system (200d) are decoupled from each other, the VTM system (200d) vertically ascends until some desired altitude is reached (e.g., above rooflines, trees, and other obstructions). The VTM system then proceeds to pick up its next payload, or returns to some charging station for charging.

The 3-multicopter, 4-rotor VTM embodiment described above is merely exemplary and any number of multicopters (e.g., 2 multicopters, 4 multicopters, etc.) with any number of rotors (e.g., 5 rotors, 6 rotors, etc.) may be used. In some embodiments, the multicopters are not all identical (e.g., the topmost multicopter has more rotors than the lower multicopters, the topmost multicopter has more redundancy, etc.). In some embodiments, the multicopters maneuver by selectively rotating rotors at faster or slower speeds (e.g., to create a lift differential). In some applications, such multicopters are desirable because they are less expensive and/or lighter (e.g., so they are more power efficient) compared to other payload-carrying aircraft.

In some embodiments, the payload is not a package, but rather a person. For example, a passenger or user may arrange to be picked up at a pickup location and dropped off at a drop off location. In some embodiments, a basket, enclosure, or other conveyance is dropped off at the pickup location prior to the designated pickup time (e.g., by the transportation company that the passenger/user made arrangements with). In one example, prior to the designated pickup time, the passenger/user gets into the conveyance, the VTM system picks up the conveyance with the passenger/user inside, and takes the VTM system with the passenger/user inside to the designated drop off location (e.g., all without the VTM system landing, as described above). These are some examples of how a VTM system may be used and are not intended to be limiting.

One benefit to a VTM system is that the payload-to-weight ratio of a VTM system is higher than some other types of aircraft, which makes a VTM system more (e.g., power) efficient. For example, if a single multicopter were used to transport a payload with the same weight, that multicopter would be much heavier since it would have more reinforcement (e.g., because the rotors would have to spin faster which would cause more vibration). The weight from the additional reinforcement would make the single multicopter less (e.g., power) efficient than using multiple multicopters.

Another benefit to a VTM system is that it takes up less space laterally. To carry the same payload weight, a single multicopter would be much longer and/or wider which would require a larger space (e.g., footprint) at the pickup and drop off locations. In contrast, because the multicopters in a VTM system are arranged vertically and each multicopter is relatively small, a VTM system does not need as much space at the pickup and drop off locations.

Another benefit to a VTM system is that there is less ground impact with respect to downwash. Because of the vertical arrangement of multicopters, only the lowest multicopter would realistically contribute to downwash felt at the pickup or drop off location and since the VTM system does not land when picking up or dropping off a payload, that lowest multicopter would be fairly high off the ground (e.g., not at ground effect distances), which further reduces the downwash felt on the ground.

The following figure describes this example more generally and/or formally in a flowchart.

Figure 3:
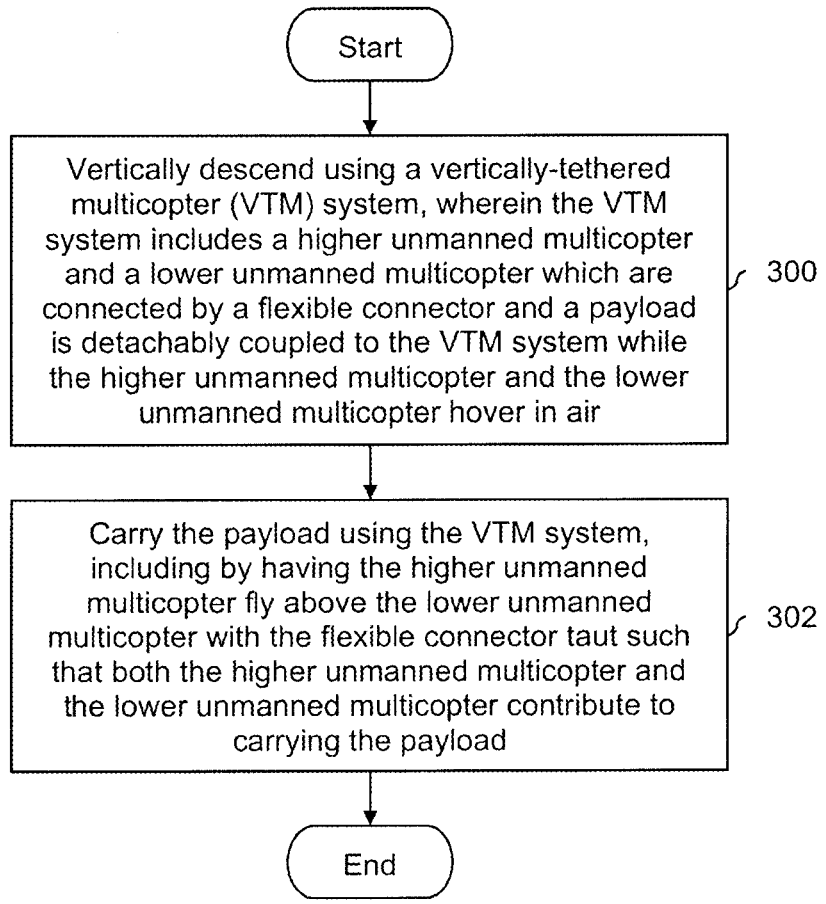
FIG. 3 is a flowchart illustrating an embodiment of a process to pick up a payload using a vertically-tethered multicopter (VTM) system.

FIG. 3 is a flowchart illustrating an embodiment of a process to pick up a payload using a vertically-tethered multicopter (VTM) system. At 300, a vertical descent is performed using a vertically-tethered multicopter (VTM) system, wherein the VTM system includes a higher unmanned multicopter and a lower unmanned multicopter which are connected by a flexible connector and a payload is detachably coupled to the VTM system while the higher unmanned multicopter and the lower unmanned multicopter hover in air. See, for example, FIG. 2A where VTM system 200a is descending vertically and payload 202a is beneath the VTM system on the ground. See also, FIG. 2B where VTM system 200b is hovering in the air at a height low enough so that payload 202b can be detachably coupled to the VTM system.

At 302, the payload is carried using the VTM system, including by having the higher unmanned multicopter fly above the lower unmanned multicopter with the flexible connector taut such that both the higher unmanned multicopter and the lower unmanned multicopter contribute to carrying the payload. See, for example, FIG. 1. The vertical alignment or positioning of the two multicopters (102 and 104) as well as the taut state of flexible connector 106 causes the weight of the payload (100) to be distributed between the higher multicopter (102) and the lower multicopter (104).

Figure 4:
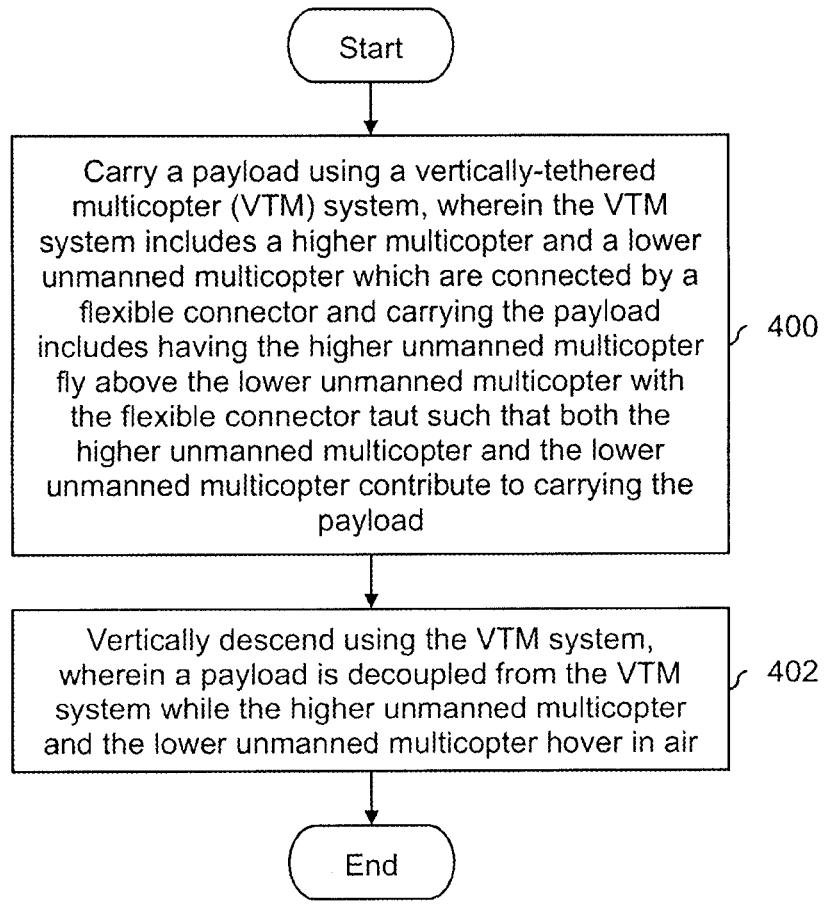
FIG. 4 is a flowchart illustrating an embodiment of a process to drop off a payload using a VTM system.

FIG. 4 is a flowchart illustrating an embodiment of a process to drop off a payload using a VTM system. At 400, a payload is carried using a vertically-tethered multicopter (VTM) system, wherein the VTM system includes a higher multicopter and a lower unmanned multicopter which are connected by a flexible connector and carrying the payload includes having the higher unmanned multicopter fly above the lower unmanned multicopter with the flexible connector taut such that both the higher unmanned multicopter and the lower unmanned multicopter contribute to carrying the payload. See, for example, FIG. 1.

At 402, a vertical descent is performed using the VTM system, wherein a payload is decoupled from the VTM system while the higher unmanned multicopter and the lower unmanned multicopter hover in air. See, for example, FIG. 2C where a payload (202c) is detachably coupled to a VTM system (200c) and both are descending vertically towards a drop off location on the ground. Once the payload reaches the ground (not shown), the VTM system will stop its descent and hover in the air while the payload is decoupled from the VTM system.

The following figures describe some example features associated with the flexible connector (e.g., which connects two or more multicopters). In some embodiments described below, the flexible connector is designed to shorten when there is no pull or tension on the line. This may be desirable because there may occasionally be slack in a given line or segment between two adjacent multicopters. A flexible connector which shortens under these conditions may prevent the flexible connector from becoming tangled in the rotors of a lower multicopter.

FIG. 5A is a diagram illustrating an embodiment of a flexible connector with an elastic portion. In this example, the flexible connector (500) includes an elastic portion (502). In some embodiments, the elastic portion is a bungee cord or something with similar load-bearing and/or elastic properties. When there is no pull or tension on the line (e.g., between two adjacent multicopters), the elastic portion will shorten, causing the overall length to decrease. For example, if a higher multicopter descends but a lower multicopter holds its altitude, then there will be some slack on the flexible connector. When there is pull or tension on the flexible connector (e.g., a higher multicopter ascends and a lower multicopter maintains its altitude), the elastic portion will extend until some maximum length is reached. Including an elastic portion in a flexible connector may be attractive because it is lighter compared to some other options for shortening a flexible connector when there is no pull or tension on the line (e.g., a retractable, roll-up flexible connector).

FIG. 5B is a diagram illustrating an embodiment of a flexible connector with an elastic portion and an inelastic portion. In this example, the flexible connector (510) includes an elastic portion (512) and an inelastic portion (514) connected in parallel with each other. When there is no pull or tension on the line, the elastic portion (512) will shorten, as shown here. This will pull up the bottom end of the inelastic portion (514), as shown here. When there is some pull or tension on the line (not shown), the elastic portion (512) will stretch until it is limited by the length of the inelastic portion (514). In some embodiments, using an elastic portion and an inelastic portion connected in parallel as shown may be desirable because the inelastic portion better limits how much the flexible connector can stretch (e.g., compared to the configuration shown in diagram 500) and/or prevents the elastic portion from being stretched too far (e.g., where it can no longer retract or pull itself in).

FIG. 5C is a diagram illustrating an embodiment of a retractable, roll-up flexible connector. In this example, the flexible connector (520) includes a case (522) into which the line (524) rolls up into if there is no pull or tension on the line. If there is pull or tension on the line, then the flexible connector unwinds from the case until some maximum length is reached. In some embodiments, a spring is used to pull the flexible connector into the case where it is rolled up when there is no tension or pull on the line.

In some embodiments, an inelastic portion of a flexible connector (e.g., 514 in FIG. 5B and/or 524 in FIG. 5C) has on the order of ¼ of an inch thickness and/or a mass on the order of 25 grams per meter.

FIG. 5D is a diagram illustrating an embodiment of a flexible connector with a communication line and a load-bearing line. In this example, the flexible connector (530) includes a communication line (532) running in parallel to a load-bearing line (534) between multicopters. For example, the communication line permits the multicopters to communicate with each other over a wired connection, which is more reliable than wireless communication. Any load or weight from the payload (if any) and/or lower multicopters (if any) is borne by the load-bearing line and not the communication line.

FIG. 5E is a diagram illustrating an embodiment of a flexible connector with a power line and a load-bearing line. In this example, the flexible connector (540) includes a power line (542) running in parallel to a load-bearing line (544). For example, as is described in more detail below, in some embodiments a battery is temporarily acquired when the payload is picked up and the power line permits the multicopters in the VTM system to access the power stored in the battery.

For visibility, the communication line and power line are shown with a separation between those lines and the flexible connector. In some embodiments, all of the lines are connected to each other, for example so that all of the lines can be shortened where there is no slack or tension to prevent them from being tangled in the rotors of a lower multicopter. In some embodiments, the lines are twisted around each other to connect them. In some embodiments, the lines are bound together, for example using Velcro strips or plastic zip ties at regular intervals.

Figure 6:
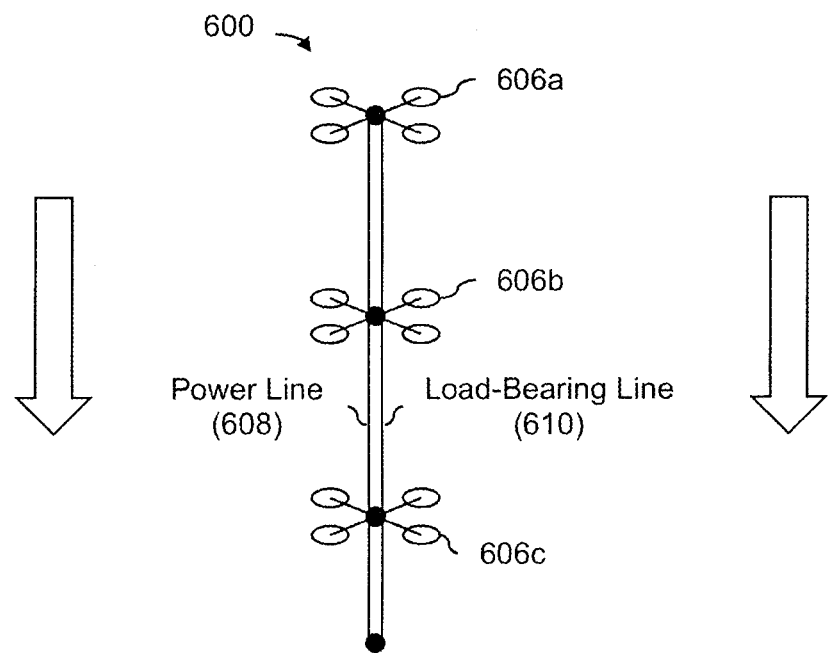
FIG. 6 is a diagram illustrating an embodiment of a vertically-tethered multicopter (VTM) system which picks up a battery along with the payload.
Figure 6:
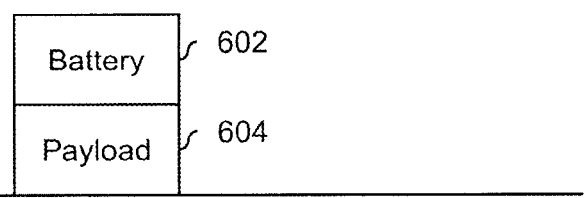

FIG. 6 is a diagram illustrating an embodiment of a vertically-tethered multicopter (VTM) system which picks up a battery along with the payload. In the example shown, VTM system 600 is hovering above and about to pick up a battery (602) which is coupled to a payload (604). The flexible connector which connects the multicopters (606a-606c) to each other includes a power line (608) and a load-bearing line (610). Once the VTM system has descended low enough, the power line (608) is coupled to the battery (602) and the load-bearing line (610) is coupled to the payload (604). With the electrical connection to the battery (602) established via the power line (608), the multicopters (606a-606c) in the VTM system are able to access and use the power stored in the battery. In some embodiments, once electrically connected to the battery (602), the multicopters (606a-606c) switch over to the battery (602) during flight to conserve the power in their internal batteries. In some embodiments, the multicopters (606a-606c) use the battery (602) to recharge their internal batteries during flight.

Coupling a battery to a payload as shown here may be attractive because it reduces the downtime of the VTM system. For example, instead of having to land to recharge or swap out the internal batteries in the multicopters (606a-606c), the internal batteries can be recharged during delivery of the payload. Takeoff and/or landing for a VTM system may also be slow and/or difficult and reducing the number of takeoffs and landings may be desirable.

It is important for the topmost multicopter (606a) to not lose power. If the topmost multicopter lost power, it would fall and the tether would become tangled in the rotors of one or both of the lower multicopters (e.g., 606b and/or 606c). In contrast, if one of the lower multicopters (e.g., 606b and/or 606c) lost power, the VTM system would still be able to fly because the multicopter without power would just act like dead weight but the tether would not necessarily become tangled in the rotors of one of the multicopters. To ensure the topmost multicopter (606a) does not lose power, in some embodiments the power line (608) is used to transfer power from one or more of the lower multicopters (e.g., 606b and/or 606c) to the topmost multicopter (606a) as/if needed. If needed, it would be preferable to drain the internal battery of the middle multicopter (606b) and/or bottom multicopter (606c), causing one or both to lose power, compared to letting the topmost multicopter (606a) lose power.

These examples are described more formally and/or generally in the flowcharts below.

Figure 7:
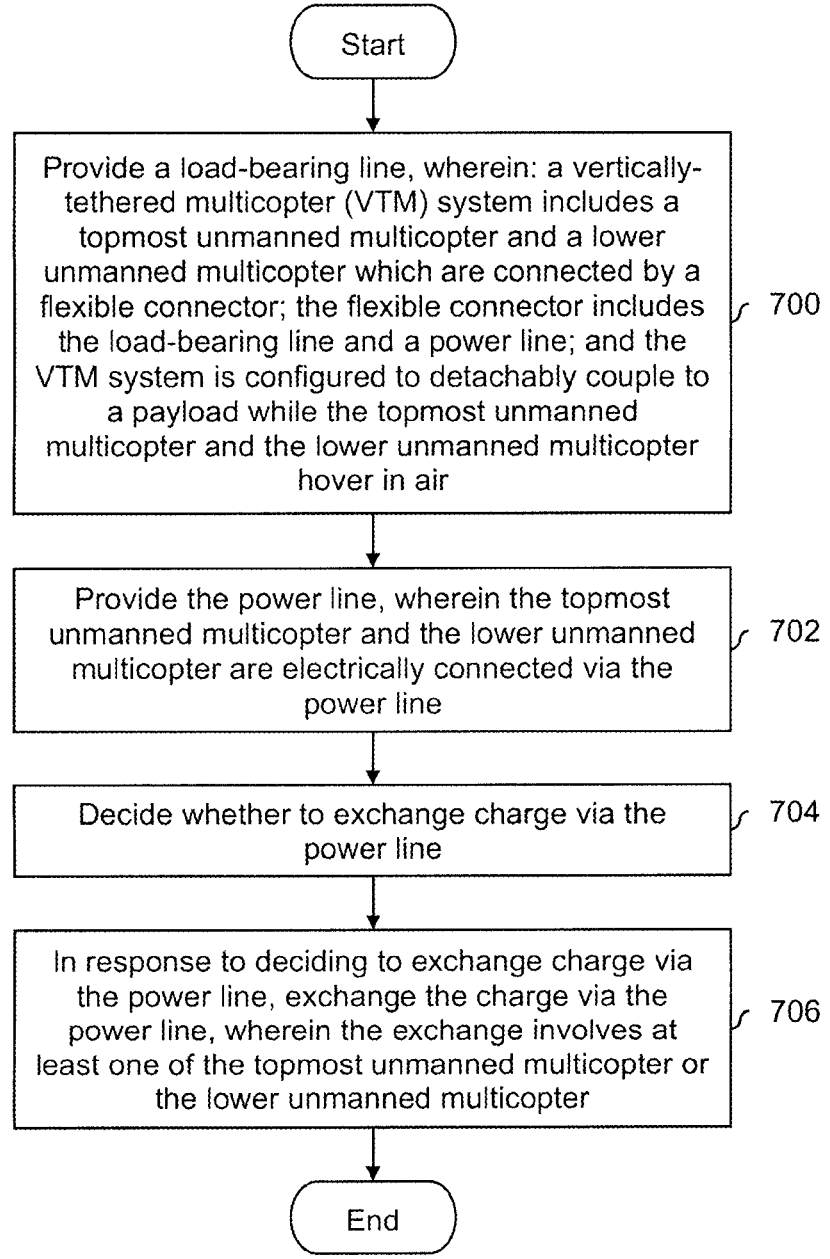
FIG. 7 is a flowchart illustrating an embodiment of a process to exchange charge via a power line.

FIG. 7 is a flowchart illustrating an embodiment of a process to exchange charge via a power line. In some embodiments, the process is used to send charge from a lower multicopter to a topmost multicopter so that the topmost multicopter does not lose power and crash. In some embodiments, the process is used to draw charge from a battery (e.g., during transport of a payload where the battery is detachably coupled to a power line and the payload is detachably coupled to a load-bearing line).

At 700, a load-bearing line is provided, wherein: a vertically-tethered multicopter (VTM) system includes a topmost unmanned multicopter and a lower unmanned multicopter which are connected by a flexible connector; the flexible connector includes the load-bearing line and a power line; and the VTM system is configured to detachably couple to a payload while the topmost unmanned multicopter and the lower unmanned multicopter hover in air. See, for example, FIG. 6. As described above, once VTM system 600 descends low enough, the load-bearing line (610) is attached to the payload (604) on the ground. This coupling or connection occurs while the VTM system hovers in the air.

At 702, the power line is provided, wherein the topmost unmanned multicopter and the lower unmanned multicopter are electrically connected via the power line. See, for example, FIG. 6 where charge can be exchanged via power line 608 to/from any of multicopters 606a-606c. In some cases the charge comes from battery 602; in other cases the charge comes from a lower multicopter such as multicopter 606b and/or 606c.

At 704, it is decided whether to exchange charge via the power line. For example, as is described in more detail below, charge may be exchanged when a battery is detected on the power line and/or if the topmost multicopter is in danger of running out of charge and causing the entire VTM system to crash.

At 706, in response to deciding to exchange charge via the power line, the charge is exchanged via the power line, wherein the exchange involves at least one of the topmost unmanned multicopter or the lower unmanned multicopter. For example, in FIG. 6, topmost multicopter 606a may draw charge from middle multicopter 606b and/or bottom multicopter 606c. Or, if the battery (602) is connected to the power line (608), any of multicopters 606a-606c may draw charge from the battery.

Figure 8A:
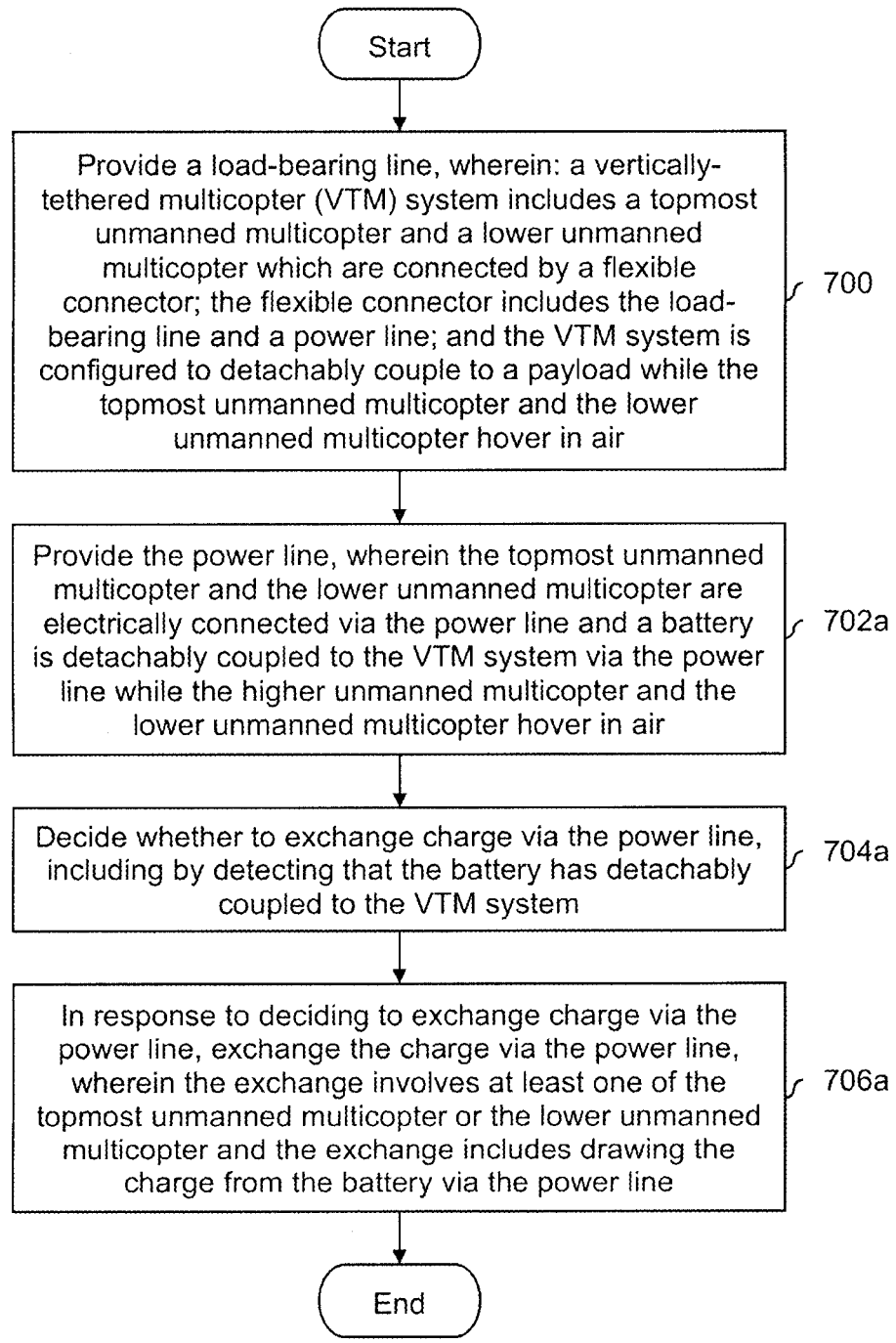
FIG. 8A is a flowchart illustrating an embodiment of a process to draw charge from a battery via a power line.

FIG. 8A is a flowchart illustrating an embodiment of a process to draw charge from a battery via a power line. FIG. 8A is related to FIG. 7 and for convenience the same or similar reference numbers are used to indicate the same or related steps.

At 700, a load-bearing line is provided, wherein: a vertically-tethered multicopter (VTM) system includes a topmost unmanned multicopter and a lower unmanned multicopter which are connected by a flexible connector; the flexible connector includes the load-bearing line and a power line; and the VTM system is configured to detachably couple to a payload while the topmost unmanned multicopter and the lower unmanned multicopter hover in air.

At 702a, the power line is provided, wherein the topmost unmanned multicopter and the lower unmanned multicopter are electrically connected via the power line and a battery is detachably coupled to the VTM system via the power line while the higher unmanned multicopter and the lower unmanned multicopter hover in air. See, for example, FIG. 6.

At 704a, it is decided whether to exchange charge via the power line, including by detecting that the battery has detachably coupled to the VTM system.

At 706a, in response to deciding to exchange charge via the power line, the charge is exchanged via the power line, wherein the exchange involves at least one of the topmost unmanned multicopter or the lower unmanned multicopter and the exchange includes drawing the charge from the battery via the power line.

In some embodiments (e.g., if the topmost multicopter is not in danger of running out of charge), all of the multicopters equally access the charge. Alternatively, the multicopter with the lowest amount of charge can be prioritized. In some embodiments (e.g., if the topmost multicopter has less than some threshold amount of charge), all of the charge from the battery is directed to the topmost multicopter to prevent a crash.

Figure 8B:
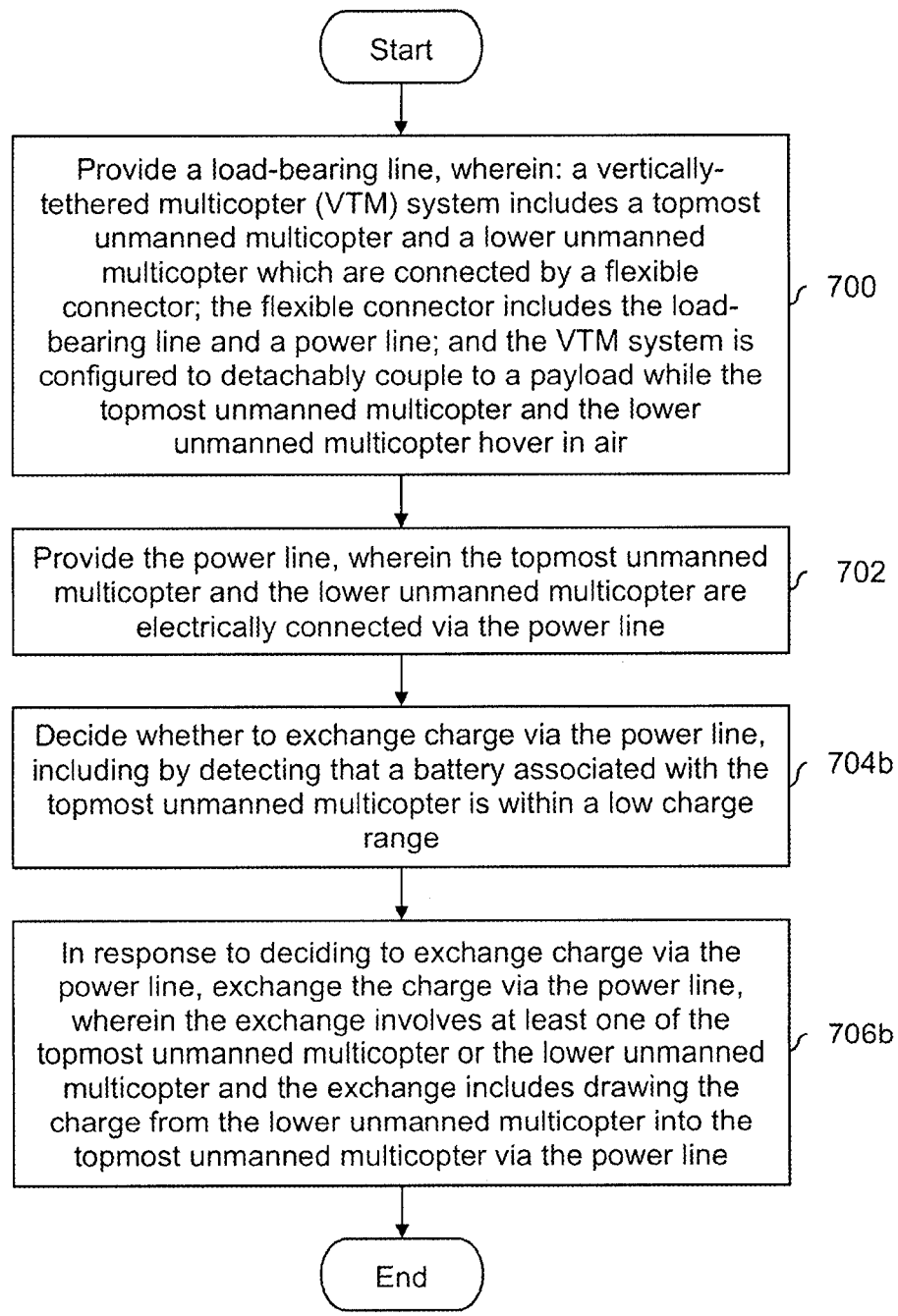
FIG. 8B is a flowchart illustrating an embodiment of a process to draw charge from a lower multicopter into a topmost multicopter via a power line.

FIG. 8B is a flowchart illustrating an embodiment of a process to draw charge from a lower multicopter into a topmost multicopter via a power line. FIG. 8B is related to FIG. 7 and for convenience the same or similar reference numbers are used to indicate the same or related steps.

At 700, a load-bearing line is provided, wherein: a vertically-tethered multicopter (VTM) system includes a topmost unmanned multicopter and a lower unmanned multicopter which are connected by a flexible connector; the flexible connector includes the load-bearing line and a power line; and the VTM system is configured to detachably couple to a payload while the topmost unmanned multicopter and the lower unmanned multicopter hover in air. See, for example, FIG. 6.

At 702, the power line is provided, wherein the topmost unmanned multicopter and the lower unmanned multicopter are electrically connected via the power line. See, for example, FIG. 6. Charge can be shunted between any pair of battery-powered multicopters (e.g., each of which has its own (internal) battery) in that example via power line 608.

At 704b, it is decided whether to exchange charge via the power line, including by detecting that a battery associated with the topmost unmanned multicopter is within a low charge range. For example, if topmost multicopter 606a in FIG. 6 had a charge percentage or flight time less than some threshold, a low charge flag would be asserted and it would be decided to draw charge from one or more lower multicopters to keep the topmost multicopter airborne.

At 706b, in response to deciding to exchange charge via the power line, the charge is exchanged via the power line, wherein the exchange involves at least one of the topmost unmanned multicopter or the lower unmanned multicopter and the exchange includes drawing the charge from the lower unmanned multicopter into the topmost unmanned multicopter via the power line. For example, charge from middle multicopter 606b and/or bottom multicopter 606c is shunted via power line 608 to topmost multicopter 606a, even at the expense of a donor multicopter running out of charge and being unable to fly. As described above, a VTM system cannot fly if the topmost multicopter cannot fly, but the VTM system still might be able to fly even if one or more lower multicopters cannot fly. It is noted that this charge donation or shunting can occur even if there is no battery attached to the power line (e.g., the VTM system is not carrying a payload).

The following figure describes an example of how the orientation and spacing between multicopters may be chosen.

Figure 9:
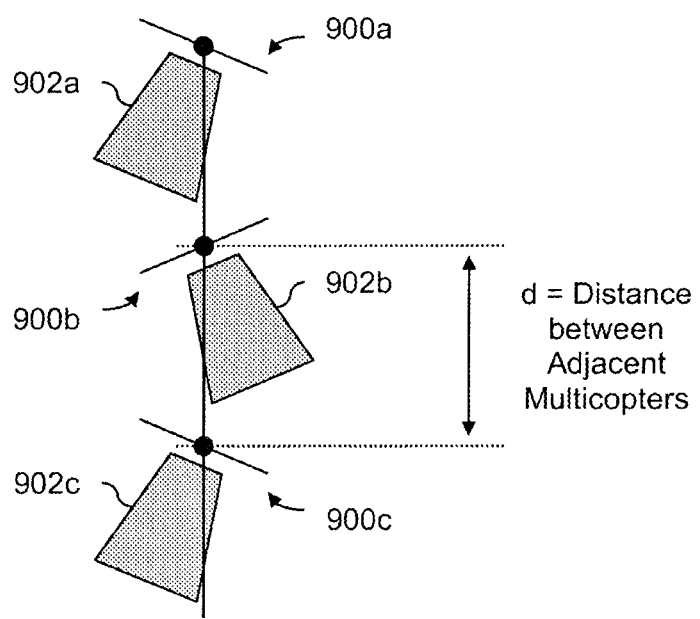
FIG. 9 is a diagram illustrating an embodiment of a vertically-tethered multicopter (VTM) system where the multicopters are spaced and oriented to mitigate interference from downwash.

FIG. 9 is a diagram illustrating an embodiment of a vertically-tethered multicopter (VTM) system where the multicopters are spaced and oriented to mitigate interference from downwash. In this example, the multicopters (900a-900c) are slightly angled or otherwise tilted to reduce or otherwise mitigate the downwash from one multicopter felt by the next lower multicopter. Note, for example, that multicopters 900a-900c are not rotating within a level or horizontal plane.

For example, the topmost multicopter (900a) produces downwash 902a. Because the topmost multicopter (900a) is angled slightly off center, downwash 902a does not blow directly downwards into the rotors of the middle multicopter (900b) but rather slightly to the side.

Similarly, the middle multicopter (900b) is angled or otherwise tilted (in this case, in the other direction compared to the topmost multicopter) so that its downwash (902b) does not blow directly into the rotors of the bottom multicopter (900c). In this example, the bottom multicopter (900c) is also shown as angled with downwash 902c, but that may not be necessary since there is no multicopter below it.

In this example, the distance between adjacent multicopters (d) also takes into account downwash. d is set to some value (e.g., sufficiently far apart) where a lower multicopter observes little or no downwash from the next higher multicopter. For example, d may be set to a value that is in the range of 9-30 times the rotor diameter of the multicopters. In one example, for a quadcopter with an overall width on the order of 1-2 meters (and correspondingly sized rotors), 3 meters of separation may be too close whereas 20 meters of separation may be far enough apart so that little or no downwash is felt by a lower multicopter.

Designing and/or flying a VTM system in a manner that minimizes the downwash felt by the multicopters may be desirable because it may make flying the VTM system easier (e.g., because the multicopters do not have to compensate for the downwash) and/or conserve battery power (e.g., because the multicopters do not have to fight the downwash).

In general, taking off and landing is one of the more difficult parts of flying. With a VTM system, multiple, independent multicopters must be managed. The following figures describe some examples of how a VTM system may take off and land.

Figure 10:
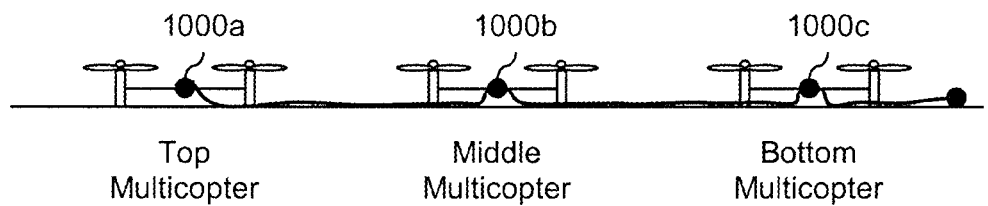
FIG. 10 is a diagram illustrating an embodiment of a takeoff and landing position for a vertically-tethered multicopter (VTM) system.

FIG. 10 is a diagram illustrating an embodiment of a takeoff and landing position for a vertically-tethered multicopter (VTM) system. In the example shown, the VTM system is on the ground with the multicopters arranged in a row. In this example, the VTM takes off from the position shown by first having the top multicopter (1000a) take off. The middle multicopter (1000b) then takes off and then finally the bottom multicopter (1000c) takes off.

Landing occurs in the opposite order. The bottom multicopter (1000c) lands first. The remaining multicopters then move laterally (e.g., so they are no longer hovering over the landed, bottom multicopter) and the middle multicopter (1000b) lands. The top multicopter (1000a) repeats this process, moving to the side of the middle multicopter (1000b) and landing next to it so that they all are in the position shown.

Alternatively, in some embodiments at least some of the multicopters in a VTM system are able to detach or otherwise decouple themselves from the tether and take off and land without being connected to the tether and/or other multicopters. The following figure shows one such example.

Figure 11:
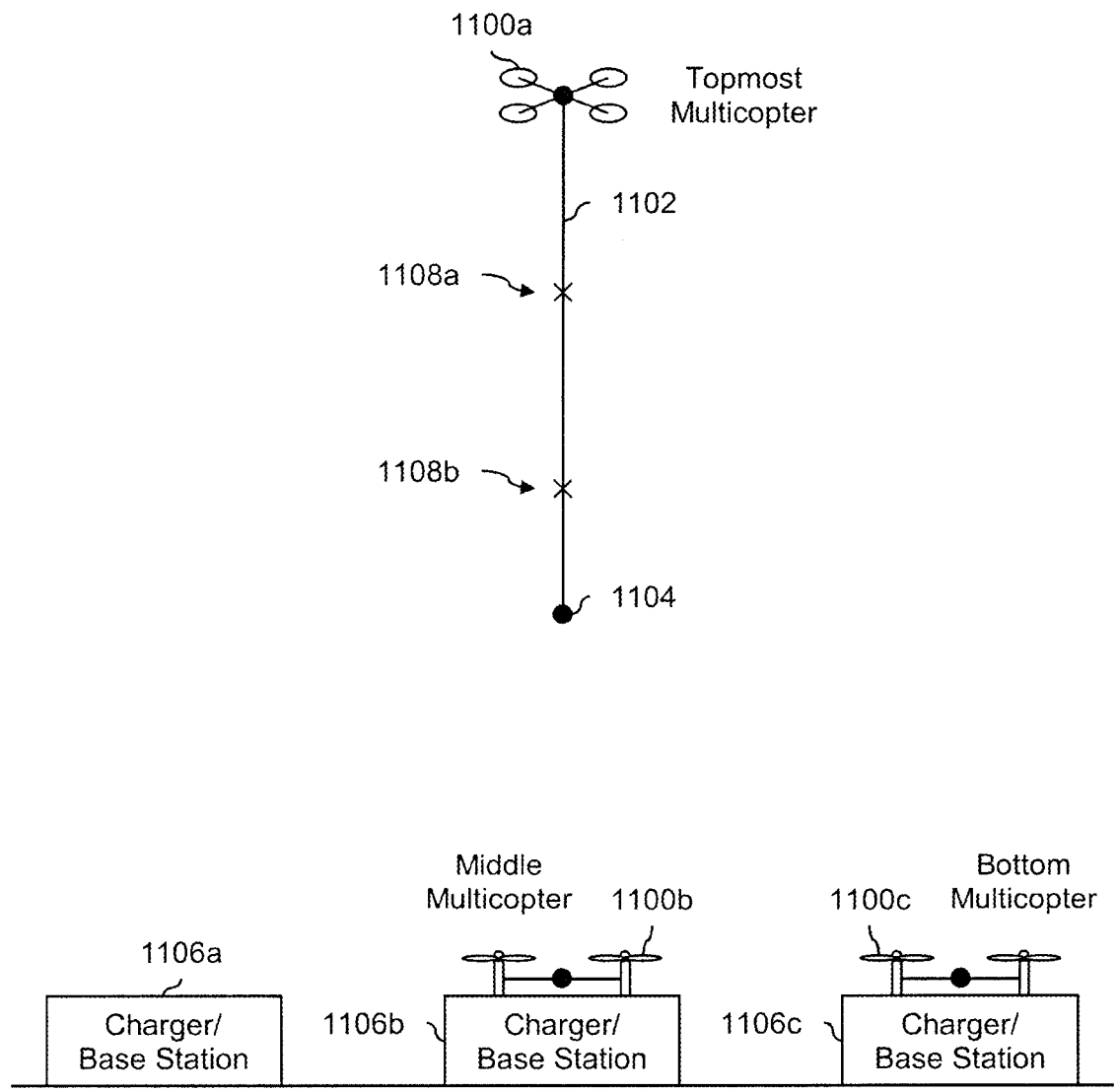
FIG. 11 is a diagram illustrating an embodiment of a vertically-tethered multicopter (VTM) system with detachable multicopters.

FIG. 11 is a diagram illustrating an embodiment of a vertically-tethered multicopter (VTM) system with detachable multicopters. In the example shown, a top multicopter (1100a) in the VTM system is airborne with the flexible connector (1102) attached to the topmost multicopter (1100a). To prevent the flexible connector from being blown about by the wind, a weight (1104) is attached to the end of the flexible connector in this example. The weight may simply be a connector which is used to connect the flexible connector to a payload and/or battery.

The middle multicopter (1100b) and bottom multicopter (1100c) are on the ground and are turned off (e.g., their rotors are not spinning). In this example, each multicopter has a corresponding base station (1106a-1106c) which that multicopter takes off from, lands on, and uses to charge. For example, near field charging techniques may be used so that a wired connection or plug into the multicopter is not required to charge the multicopter. Alternatively, there may be some cord or plug which is inserted into or connected to the multicopter and used to charge the multicopter.

During takeoff, the top multicopter (1100a) with the flexible connector attached takes off and hovers at a steady position. The altitude of the top multicopter is sufficiently high so that all connection points (e.g., 1108a and 1108b) on the flexible connector are exposed and accessible to the other multicopters. Then, with the top multicopter holding steady, the middle multicopter (1100b) and bottom multicopter (1100c) take off and attach themselves to the flexible connector at connection points 1108a and 1108b, respectively. In some embodiments, only one multicopter is in the air at a time trying to connect to the flexible connector. Alternatively, the multicopters may be simultaneously in the air and/or trying to connect to the flexible connector.

A variety of indicators may be used to indicate where the multicopters should attach themselves on the flexible connector. In some embodiments, bright and/or high contrast tape or paint is used at 1108a and 1108b so that a pilot can see (e.g., from the ground) where the multicopters should attach to the flexible connector. If needed, the flexible connector may have some connector (e.g., which remains on the flexible connector even when the multicopter is not attached to the flexible connector) at the connection points. Any appropriate connection technique or device may be used.

To land the VTM system, the middle and bottom multicopters detach themselves and return to their respective base stations. As during takeoff, the multicopters may detach and land one at a time or simultaneously. To prevent the flexible connector from tangling in the rotors of the middle or bottom multicopter, the top multicopter waits until the middle and bottom multicopters have landed on their respective base stations before descending. In this example, the flexible connector remains attached to the top multicopter (e.g., so that it does not have to be reattached at the next takeoff).

Generally speaking, it is more difficult to fly a multicopter when it is attached to a flexible connector and/or other multicopters, so using detachable multicopters may make taking off and landing easier and/or faster.

Detachable multicopters may also prove useful if one of the multicopters needs service or maintenance. For example, if one of the multicopters has a low internal battery, instead of letting the internal battery run out and letting the multicopter dangle as dead weight, the multicopter with the low internal battery may detach itself and land. Or, if one of the multicopters develops a problem, that multicopter may detach itself from the flexible connector and land for repair. In both cases, the multicopter which detaches itself from the flexible connector can be replaced with a fully charged and/or fully functioning multicopter. This eliminates the need to have the entire VTM system land for maintenance and/or repair and downtime is minimized.

As described above, it is very important for the topmost multicopter in a VTM system to retain power, even at the expense of other multicopters. The following figure shows an example of a load distribution scheme with this in mind.

Figure 12:
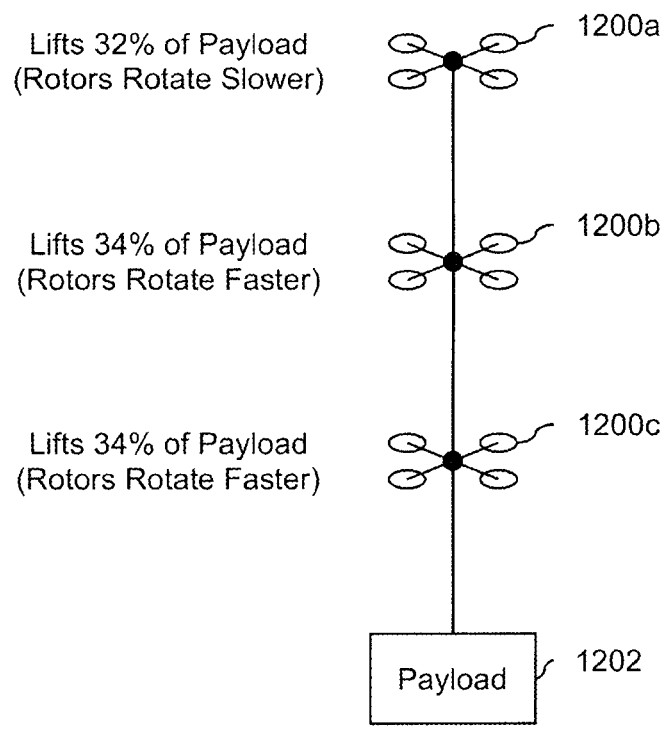
FIG. 12 is a diagram illustrating an embodiment of a load distribution scheme which conserves the power of a topmost multicopter.

FIG. 12 is a diagram illustrating an embodiment of a load distribution scheme which conserves the power of a topmost multicopter. In the example shown, the topmost multicopter (1200a) has the lowest load distribution and lifts 32% of the weight of the payload (1202). The middle multicopter (1200b) and bottom multicopter (1200c) have higher load distributions and each lift 34% of the payload's weight. It is noted that these numbers are merely exemplary and are not intended to be limiting.

To put it in terms of the rotational speed of the rotors, this means that the rotors in the topmost multicopter rotate slower than the rotors in the middle and bottom multicopters. This causes the internal batteries in the middle and bottom multicopters to be drained faster than the internal battery in the topmost multicopter. Since the VTM system can still fly when the middle or bottom multicopter runs out of power but cannot fly when the topmost multicopter is out of power, it is very important to keep the internal battery in the topmost multicopter charged. For this reason, a load distribution in which the topmost multicopter has the smallest load distribution is attractive and some VTM system embodiments may be configured to fly in this manner.

The following figure describes this example more generally and/or formally in a flowchart.

Figure 13:
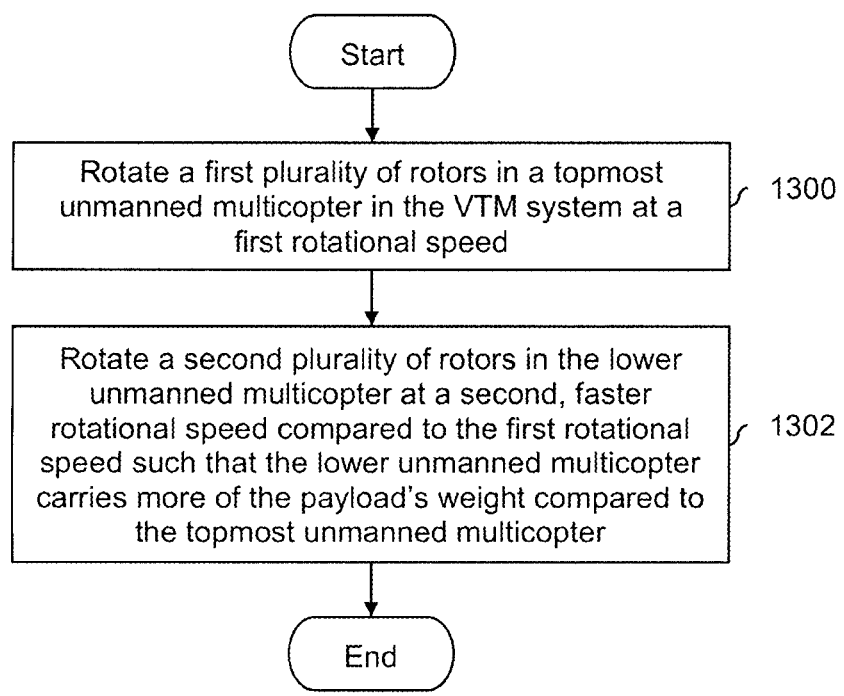
FIG. 13 is a flowchart illustrating an embodiment of a process to distribute load between a topmost unmanned multicopter and a lower unmanned multicopter.

FIG. 13 is a flowchart illustrating an embodiment of a process to distribute load between a topmost unmanned multicopter and a lower unmanned multicopter. In some embodiments, this process is used to carry the payload at step 302 in FIG. 3. In some embodiments, this process is used to carry the payload at step 400 in FIG. 4.

At 1300, a first plurality of rotors in a topmost unmanned multicopter in the VTM system is rotated at a first rotational speed. See, for example, topmost multicopter 1200a in FIG. 12.

At 1302, a second plurality of rotors in the lower unmanned multicopter is rotated at a second, faster rotational speed compared to the first rotational speed such that the lower unmanned multicopter carries more of the payload's weight compared to the topmost unmanned multicopter. See, for example, middle multicopter 1200b or bottom multicopter 1200c in FIG. 12. Both of those multicopters rotate their rotors faster than the topmost multicopter so that more of the weight of the payload is borne by the lower multicopters compared to the topmost multicopter. In terms of power consumption, the battery of the topmost multicopter is conserved at the expense of the batteries of the lower multicopters.

Figure 14:
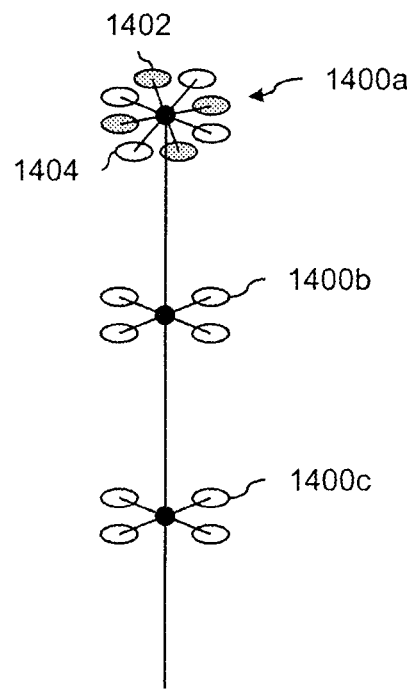
FIG. 14 is a diagram illustrating an embodiment of a vertically-tethered multicopter (VTM) system where the topmost multicopter is an octocopter and the middle and bottom multicopters are quadcopters.

FIG. 14 is a diagram illustrating an embodiment of a vertically-tethered multicopter (VTM) system where the topmost multicopter is an octocopter and the middle and bottom multicopters are quadcopters. As described above, a VTM system cannot fly if the topmost multicopter (1400a) cannot fly, but a VTM can fly if one of the other multicopters (e.g., middle multicopter 1400b or bottom multicopter 1400c) cannot fly. In some embodiments, the topmost multicopter has more rotors and/or redundancy as shown here. In this example, the octocopter (i.e., a multicopter with eight rotors) includes two (e.g., independent) quadcopters: quadcopter (i.e., a multicopter with four rotors) 1402 and quadcopter 1404. If one of the quadcopters fails (e.g., 1402), the other quadcopter (e.g., 1404) can still fly because the two quadcopters are independent (e.g., they have independent batteries, independent flight computers, etc.). This provides (e.g., additional) redundancy in the topmost multicopter so that if there is some failure (e.g., in a connector, in a component, etc.), the topmost multicopter still might be able to fly. To describe this example more generally, the topmost multicopter has more rotors than the lower multicopter(s).

Figure 15:
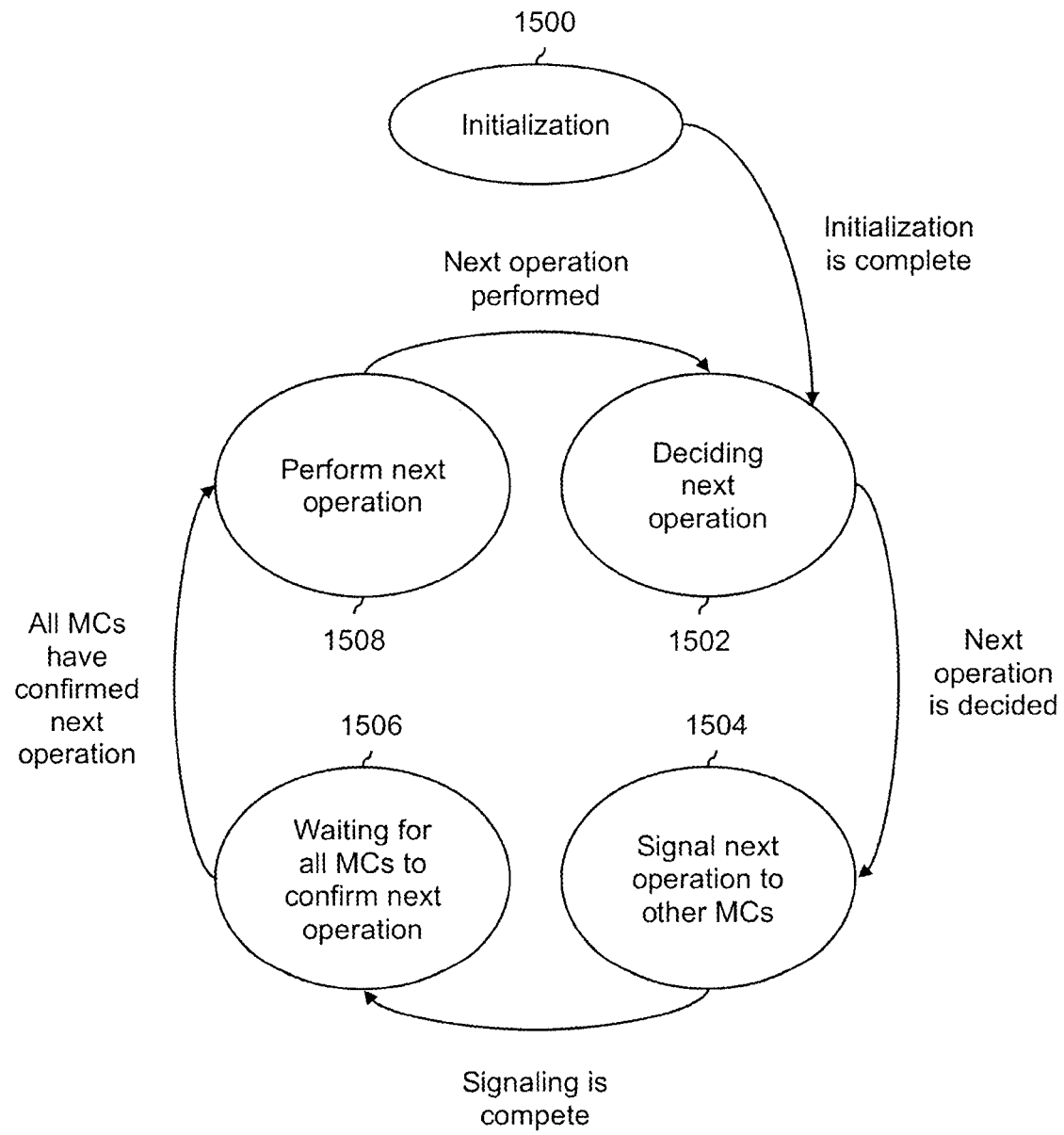
FIG. 15 is a diagram illustrating an embodiment of a state machine for multicopters in a vertically-tethered multicopter (VTM) system.

FIG. 15 is a diagram illustrating an embodiment of a state machine for multicopters in a vertically-tethered multicopter (VTM) system. In some embodiments, each of the multicopters in a VTM system performs the exemplary state machine. Generally speaking, with the state machine shown, the multicopters will not perform some operation or instruction unless all of the multicopters have communicated (e.g., via some wired or wireless communication channel) that they will be performing that operation or instruction next. This may be useful to prevent the multicopters from performing different operations (e.g., some multicopters flying one way and others flying another way) because of faulty communication.

State 1500 is an initialization state and each multicopter starts in this state when it powers on. After initialization is complete, each multicopter decides on a next operation in state 1502. For example, a multicopter may wait in state 1502 for some (e.g., new or different) instruction or command from some controller on the ground (e.g., a pilot or operator). For simplicity, assume that the VTM system is in state 1502 and is hovering at a steady or constant position. If the controller has a joystick and the joystick is in a neutral position (e.g., so that the VTM system maintains its steady position), then each multicopter will remain in state 1502 until the joystick is moved and the VTM system is instructed to change position. In some embodiments, each multicopter decides a next operation for itself (e.g., based on the input(s) from the controller and/or sensor information on that multicopter).

Once the next operation is decided, each multicopter signals the next operation (e.g., that it received and/or decided upon) to other multicopters at state 1504. As described above, this may involve wired or wireless communication.

Once signaling is complete, each multicopter waits for all multicopters to confirm the next operation at state 1506. In other words, the multicopters in this example will not perform the next operation or instruction until all multicopters have agreed to the same plan. A variety of handshaking and/or communication techniques may be used (e.g., to handle error and/or failure scenarios so that the VTM system does not get stuck in some state).

Once all multicopters have confirmed the next operation, the next operation is performed in state 1508. Once the next operation is performed, the multicopter waits in state 1502 until the next operation is decided upon.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a higher unmanned multicopter;
   a lower unmanned multicopter; and
   a flexible connector which connects the higher unmanned multicopter and the lower unmanned multicopter, wherein:
   the system is configured to carry a payload, including by having the higher unmanned multicopter fly above the lower unmanned multicopter with the flexible connector taut such that both the higher unmanned multicopter and the lower unmanned multicopter contribute to carrying the payload, and
   the flexible connector includes an elastic portion and an inelastic portion, the elastic portion configured to extend in response to tension on the flexible connector and to shorten to decrease an overall length of the flexible connector in response to no tension on the flexible connector.

2. The system recited in claim 1, wherein the flexible connector includes one or more of the following: a retractable, roll-up flexible connector; a communication line and a load-bearing line; or a power line and a load-bearing line.

3. The system recited in claim 1, wherein the system is configured to carry the payload, further including by:
   rotating a first plurality of rotors in a topmost unmanned multicopter in the system at a first rotational speed; and
   rotating a second plurality of rotors in the lower unmanned multicopter at a second, faster rotational speed compared to the first rotational speed such that the lower unmanned multicopter carries more of the payload's weight compared to the topmost unmanned multicopter.

4. The system recited in claim 3, wherein the system is configured to extend a battery life of the higher unmanned multicopter and rotating the second plurality of rotors in the lower unmanned multicopter at a second, faster rotational speed causes a battery of the lower unmanned multicopter to be drained more quickly than a battery of the higher unmanned multicopter.

5. The system recited in claim 1, wherein a topmost unmanned multicopter in the system has more rotors than the lower unmanned multicopter.

6. The system recited in claim 1, wherein the payload includes a battery and the system is further configured to at least one of:
   power at least one of the higher unmanned multicopter or the lower unmanned multicopter using the payload battery during flight; or
   recharge internal batteries of at least one of the higher unmanned multicopter or the lower unmanned multicopter using the payload battery during flight.

7. The system recited in claim 1, wherein:
   the elastic portion and the inelastic portion are connected in parallel with each other,
   the elastic portion is configured to pull up a bottom end of the inelastic portion and decrease an overall length of the flexible connector in response to no tension on the flexible connector, and
   the inelastic portion defines an extent to which the flexible connector can stretch.

8. A method, comprising:
   vertically descending using a vertically-tethered multicopter (VTM) system, wherein the VTM system includes a higher unmanned multicopter and a lower unmanned multicopter which are connected by a flexible connector and a payload is detachably coupled to the VTM system while the higher unmanned multicopter and the lower unmanned multicopter hover in air; and
   carrying the payload using the VTM system, including by having the higher unmanned multicopter fly above the lower unmanned multicopter with the flexible connector taut such that both the higher unmanned multicopter and the lower unmanned multicopter contribute to carrying the payload.

9. The method recited in claim 8, wherein the flexible connector includes one or more of the following: an elastic portion; an elastic portion and an inelastic portion in parallel; a retractable, roll-up flexible connector; a communication line and a load-bearing line; or a power line and a load-bearing line.

10. The method recited in claim 8, wherein carrying the payload using the VTM system further includes:
    rotating a first plurality of rotors in a topmost unmanned multicopter in the VTM system at a first rotational speed; and
    rotating a second plurality of rotors in the lower unmanned multicopter at a second, faster rotational speed compared to the first rotational speed such that the lower unmanned multicopter carries more of the payload's weight compared to the topmost unmanned multicopter.

11. The method recited in claim 8, wherein a topmost unmanned multicopter in the VTM system has more rotors than the lower unmanned multicopter.

12. A method, comprising:
carrying a payload using a vertically-tethered multicopter (VTM) system, wherein the VTM system includes a higher unmanned multicopter and a lower unmanned multicopter which are connected by a flexible connector and carrying the payload includes having the higher unmanned multicopter fly above the lower unmanned multicopter with the flexible connector taut such that both the higher unmanned multicopter and the lower unmanned multicopter contribute to carrying the payload; and
vertically descending using the VTM system, wherein the payload is decoupled from the VTM system while the higher unmanned multicopter and the lower unmanned multicopter hover in air.

13. The method recited in claim 12, wherein the flexible connector includes one or more of the following: an elastic portion; an elastic portion and an inelastic portion in parallel; a retractable, roll-up flexible connector; a communication line and a load-bearing line; or a power line and a load-bearing line.

14. The method recited in claim 12, wherein carrying the payload using the VTM system further includes:
rotating a first plurality of rotors in a topmost unmanned multicopter in the VTM system at a first rotational speed; and
rotating a second plurality of rotors in the lower unmanned multicopter at a second, faster rotational speed compared to the first rotational speed such that the lower unmanned multicopter carries more of the payload's weight compared to the topmost unmanned multicopter.

15. The method recited in claim 12, wherein a topmost unmanned multicopter in the VTM system has more rotors than the lower unmanned multicopter.

16. A method, comprising:
providing a load-bearing line, wherein: a vertically-tethered multicopter (VTM) system includes a topmost unmanned multicopter and a lower unmanned multicopter which are connected by a flexible connector; the flexible connector includes the load-bearing line and a power line; and the VTM system is configured to detachably couple to a payload while the topmost unmanned multicopter and the lower unmanned multicopter hover in air;
providing the power line, wherein the topmost unmanned multicopter and the lower unmanned multicopter are electrically connected via the power line;
deciding whether to exchange charge via the power line; and
in response to deciding to exchange the charge via the power line, exchanging the charge via the power line, wherein the exchange involves at least one of the topmost unmanned multicopter or the lower unmanned multicopter.

17. The method recited in claim 16, wherein:
a battery is detachably coupled to the VTM system via the power line while the topmost unmanned multicopter and the lower unmanned multicopter hover in air;
deciding whether to exchange the charge includes detecting that the battery has detachably coupled to the VTM system; and
the exchange includes drawing the charge from the battery via the power line.

18. The method recited in claim 16, wherein:
deciding whether to exchange charge includes detecting that a battery associated with the topmost unmanned multicopter is within a low charge range; and
the exchange includes drawing the charge from the lower unmanned multicopter into the topmost unmanned multicopter via the power line.

19. The method recited in claim 16, wherein the flexible connector includes one or more of the following: an elastic portion; an elastic portion and an inelastic portion in parallel; a retractable, roll-up flexible connector; a communication line and a load-bearing line; or a power line and a load-bearing line.

20. The method recited in claim 16, wherein the VTM system is configured to carry the payload, including by:
rotating a first plurality of rotors in the topmost unmanned multicopter in the VTM system at a first rotational speed; and
rotating a second plurality of rotors in the lower unmanned multicopter at a second, faster rotational speed compared to the first rotational speed such that the lower unmanned multicopter carries more of the payload's weight compared to the topmost unmanned multicopter.

21. The method recited in claim 16, wherein the topmost unmanned multicopter has more rotors than the lower unmanned multicopter.

* * * * *